United States Patent
Yasui et al.

(10) Patent No.: US 11,443,419 B2
(45) Date of Patent: Sep. 13, 2022

(54) REFERENCE IMAGE GENERATION METHOD AND PATTERN INSPECTION METHOD

(71) Applicant: NuFlare Technology, Inc., Yokohama (JP)

(72) Inventors: Yoshitaka Yasui, Yokohama (JP); Ikunao Isomura, Yokohama (JP)

(73) Assignee: NuFlare Technology, Inc., Yokohama (JP)

( * ) Notice: Subject to any disclaimer, the term of this patent is extended or adjusted under 35 U.S.C. 154(b) by 14 days.

(21) Appl. No.: 16/817,932

(22) Filed: Mar. 13, 2020

(65) Prior Publication Data
US 2020/0294218 A1    Sep. 17, 2020

(30) Foreign Application Priority Data
Mar. 13, 2019  (JP) .............................. JP2019-046245

(51) Int. Cl.
*G06T 7/00*  (2017.01)
*G06T 7/12*  (2017.01)
*G06T 7/13*  (2017.01)

(52) U.S. Cl.
CPC ................ *G06T 7/001* (2013.01); *G06T 7/12* (2017.01); *G06T 7/13* (2017.01)

(58) Field of Classification Search
CPC ... G06T 7/12; G06T 7/13; G06T 2207/30148; G06T 2207/10061; G06T 7/001
See application file for complete search history.

(56) References Cited

U.S. PATENT DOCUMENTS 5,872,864 A * 2/1999 Imade .................. G06V 30/413
                                                                382/176
9,230,317 B2    1/2016 Yasui et al.
(Continued)

FOREIGN PATENT DOCUMENTS

EP    1768049 A2 *  3/2007  ......... G06K 9/00456
JP    8-320294 A    12/1996
(Continued)

OTHER PUBLICATIONS

Japanese Office Action dated Nov. 9, 2021 in Japanese Patent Application No. 2019-046245 (with English translation), citing documents AO and AP therein, 8 pages.
(Continued)

*Primary Examiner* — Pinalben Patel
(74) *Attorney, Agent, or Firm* — Oblon, McClelland, Maier & Neustadt, L.L.P.

(57) ABSTRACT

To include reading design data of a plurality of patterns formed on a sample and characteristic information indicating characteristics of each of the patterns from a storage device, the characteristic information being additionally written in the design data, dividing a pattern formed region of the sample on which the patterns are formed, into a plurality of regions where the characteristics are different from each other on a basis of the characteristic information, calculating parameter information according to the characteristics with respect to each of the regions, where the parameter information is provided for generating a reference image from the design data to be used in an inspection of the patterns, and generating the reference image from the design data on a basis of the calculated parameter information.

7 Claims, 7 Drawing Sheets

(56) References Cited

U.S. PATENT DOCUMENTS

| | | | |
|---|---|---|---|
| 2001/0053245 A1* | 12/2001 | Sakai | G06T 7/001 382/151 |
| 2006/0245636 A1* | 11/2006 | Kitamura | G06K 9/036 382/149 |
| 2009/0273669 A1* | 11/2009 | Wertsman | G06T 7/0004 348/87 |
| 2013/0170757 A1* | 7/2013 | Shinoda | G06K 9/6202 382/209 |
| 2013/0202188 A1* | 8/2013 | Urano | G06K 9/6202 382/149 |
| 2014/0307945 A1 | 10/2014 | Yasui et al. | |
| 2015/0221075 A1* | 8/2015 | Watanabe | H04N 5/359 382/144 |
| 2018/0238816 A1* | 8/2018 | Sousa | G03F 1/84 |

FOREIGN PATENT DOCUMENTS

| | | |
|---|---|---|
| JP | 2004-214977 | 7/2004 |
| JP | 2009-229230 A | 10/2009 |
| JP | 2012-2663 A | 1/2012 |
| JP | 2014-206466 A | 10/2014 |
| JP | 2015-22192 A | 2/2015 |
| JP | 2015-59826 A | 3/2015 |
| JP | 2016-054457 A | 4/2016 |
| JP | 2017-198607 A | 11/2017 |

OTHER PUBLICATIONS

Office Action dated May 17, 2022, in Japanese Patent Application No. 2019-046245.

* cited by examiner

REFERENCE IMAGE GENERATION METHOD AND PATTERN INSPECTION METHOD

CROSS-REFERENCE TO RELATED APPLICATIONS

This application is based upon and claims the benefit of priority from Japanese Patent Application No. 2019-46245, filed on Mar. 13, 2019, the entire contents of which are incorporated herein by reference.

FIELD

Embodiments of the present invention relate to a reference image generation method and a pattern inspection method.

BACKGROUND

An inspection apparatus that inspects defects of patterns formed on a mask that is used for photolithography can perform a D-DB (Die to Database) inspection as one of inspection modes. In the D-DB inspection, an optical image of the mask optically detected by a sensor and a reference image generated on the basis of design data of the mask are compared to each other to inspect defects of the patterns.

A pattern actually drawn on a mask sometimes does not exactly match the pattern on the design data depending on characteristics of a charged particle beam used in the drawing and, for example, the pattern is drawn in some cases in a state where corners of the pattern on the design data are rounded. Therefore, an optical image obtained by imaging an actual mask in the D-DB inspection sometimes has a difference from the design data. However, this difference is not a difference caused by defects of the pattern.

In order to prevent this difference from being detected as a false defect, a reference image is generated by performing a filter operation to the design data (that is, image data) to approximate the design data to the optical image in the D-DB inspection.

In order to generate a reference image, the filter operation is conventionally performed using a set of filter coefficients common to the entire region of the mask on which the patterns are formed.

SUMMARY

However, there are dense patterns and sparse patterns on the region of the mask on which the patterns are formed, and patterns of different shapes are laid out thereon. Therefore, modes of the patterns are not uniform. In a case where a reference image is generated for a mask where the modes of the patterns are not uniform using a set of filter coefficients common to the entire region of the mask on which the patterns are formed, it is sometimes difficult to generate a high-accuracy reference image. As a result, it is difficult to detect defects of the patterns with high sensitivity and there is a risk that a false defect is detected.

An object of the present invention is to provide a reference image generation method and a pattern inspection method that can improve accuracy of a reference image and to suppress detection of a false defect.

A reference image generation method according to an aspect of the present invention comprises: reading design data of a plurality of patterns formed on a sample and characteristic information indicating characteristics of each of the patterns from a storage device, the characteristic information being additionally written in the design data; dividing a pattern formed region of the sample on which the patterns are formed, into a plurality of regions where the characteristics are different from each other on a basis of the characteristic information; calculating parameter information according to the characteristics with respect to each of the regions, where the parameter information is provided for generating a reference image from the design data to be used in an inspection of the patterns; and generating the reference image from the design data on a basis of the calculated parameter information.

In the reference image generation method described above, it is possible that the characteristic information is pattern type information indicating types of the patterns.

In the reference image generation method described above, it is possible that the characteristic information is at least either inspection rank information indicating inspection ranks of the patterns or contour information indicating contours of the patterns.

In the reference image generation method described above, before the dividing of the pattern formed region into the regions, it is possible to further comprise: calculating a density and number of edges of each of the patterns of the design data with respect to each unit of the design data having a same image size as a generation unit of the reference image; generating the pattern type information by determining a type of each of the patterns with respect to each unit of the design data on a basis of the calculated density and the calculated number of edges; and adding the pattern type information to the design data with respect to each unit of the design data.

In the reference image generation method described above, before the dividing of the pattern formed region into the regions, it is possible to further comprise adding at least either the inspection rank information or the contour information to the design data in response to a user operation.

A pattern inspection method according to another aspect of the present invention comprises: reading design data of a plurality of patterns formed on a sample and characteristic information indicating characteristics of each of the patterns from a storage device, the characteristic information being additionally written in the design data; dividing a pattern formed region of the sample on which the patterns are formed, into a plurality of regions where the characteristics are different from each other on a basis of the characteristic information; calculating parameter information according to the characteristics with respect to each of the regions, where the parameter information is provided for generating a reference image from the design data to be used in an inspection of the patterns; generating the reference image from the design data on a basis of the calculated parameter information; and inspecting a defect of the patterns on a basis of the reference image and an optical image obtained by imaging the sample.

According to the present invention, it is possible to improve accuracy of a reference image and to suppress detection of a false defect.

DETAILED DESCRIPTION

Embodiments of the present invention will now be explained in detail with reference to the accompanying drawings. The present invention is not limited to the embodiments. In the drawings referred in the embodiments, same parts or parts having identical functions are denoted by like or similar reference characters and redundant explanations thereof are omitted.

First Embodiment

Figure 1:
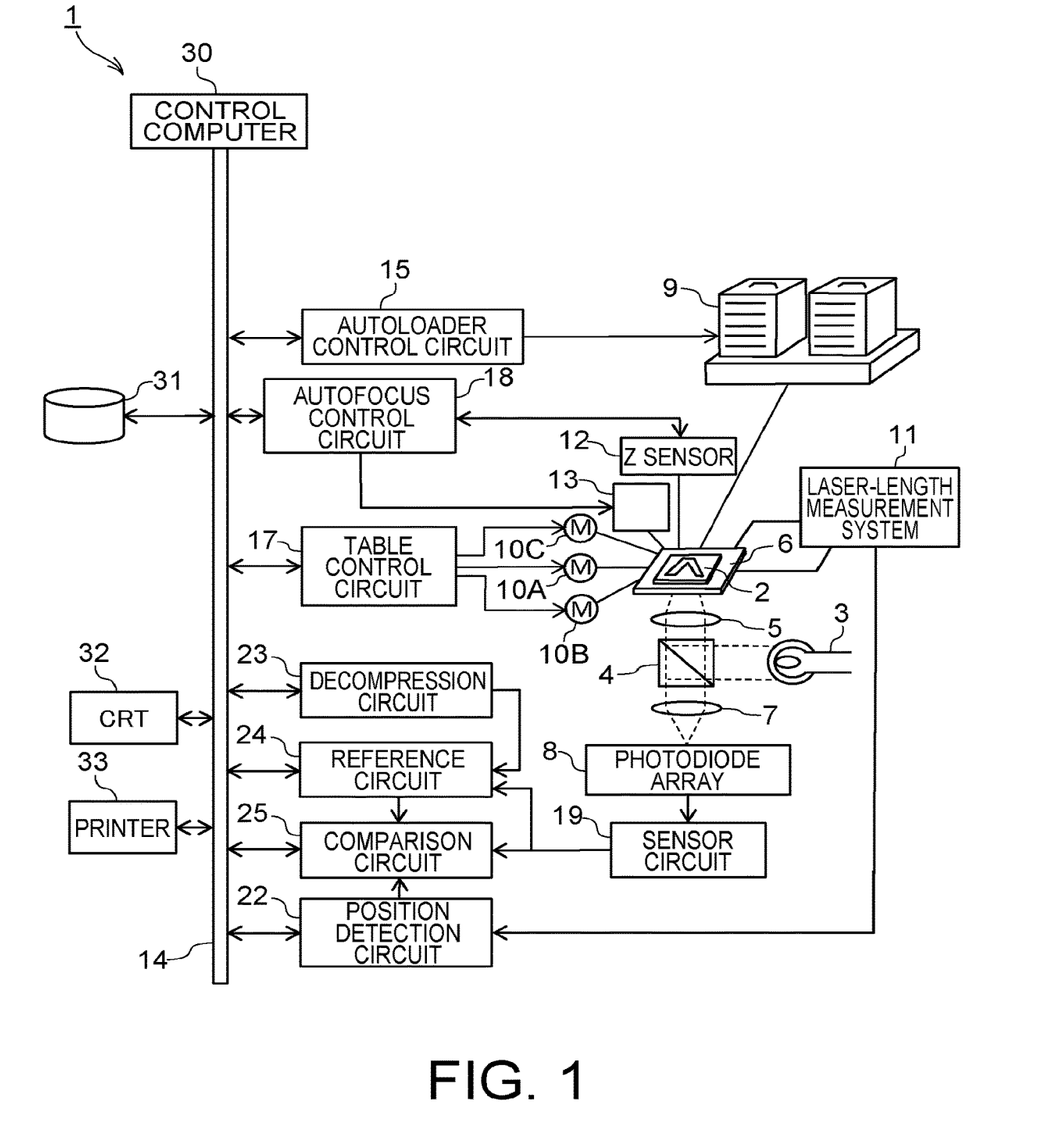
FIG. 1 is a diagram illustrating an example of a pattern inspection apparatus that can perform a pattern inspection method according to a first embodiment.

FIG. 1 is a diagram illustrating an example of a pattern inspection apparatus that can perform a pattern inspection method according to a first embodiment. A pattern inspection apparatus 1 illustrated in FIG. 1 can be used, for example, to inspect defects of patterns formed on a mask 2 (that is, a sample) by a D-DB inspection. The patterns include a pattern transferred onto a wafer and a pattern not transferred onto a wafer, such as SRAF (Sub Resolution Assist Features) that is an auxiliary pattern for exposure.

As illustrated in FIG. 1, the pattern inspection apparatus 1 includes a light source 3, a polarizing beam splitter 4, an objective lens 5, an XYθ table 6, an imaging lens 7, and a photodiode array 8 in this order in the traveling direction of light. A waveplate that changes the polarizing direction of light may be placed between the polarizing beam splitter 4 and the XYθ table 6.

The light source 3 emits laser light toward the polarizing beam splitter 4. The polarizing beam splitter 4 reflects the light from the light source 3 toward the objective lens 5. The objective lens 5 applies the light reflected by the polarizing beam splitter 4 to the XYθ table 6. The mask 2 placed on the XYθ table 6 reflects the light applied by the objective lens 5. Reflection light from the mask 2 transmits through the objective lens 5 and the polarizing beam splitter 4 and then enters the imaging lens 7. The imaging lens 7 forms an image with the incident reflection light from the mask 2 on the photodiode array 8 as an optical image of the mask 2. The photodiode array 8 captures the optical image of the mask 2 and converts the captured optical image to an electrical signal through photoelectric conversion. The converted electrical signal is transmitted to a sensor circuit 19 (which will be described later) to be A/D converted, and is then transmitted as image data to a comparison circuit 25 (which will be described later). Defects of patterns formed on the mask 2 are inspected based on the image data transmitted to the comparison circuit 25.

The pattern inspection apparatus 1 also includes an autoloader 9, an X-axis motor 10A, a Y-axis motor 10B, a θ-axis motor 10C, a laser-length measurement system 11, a Z sensor 12, and a focusing mechanism 13 as illustrated in FIG. 1.

The autoloader 9 automatically conveys the mask 2 onto the XYθ table 6. The X-axis motor 10A, the Y-axis motor 10B, and the θ-axis motor 10C move the XYθ table 6 in an X direction, a Y direction, and a θ direction, respectively. With movement of the XYθ table 6, the mask 2 on the XYθ table 6 is scanned with the light from the light source 3. The laser-length measurement system 11 detects positions of the XYθ table 6 in the X direction and the Y direction.

The Z sensor 12 detects the height of a mask on which the pattern is formed, that is, the position thereof in the Z direction. The Z sensor 12 may include, for example, a phototransmitter that applies light to the mask, and a photoreceiver that receives the applied light.

The focusing mechanism 13 performs focusing to place the focus of the objective lens 5 on the mask. The focusing is performed, for example, by moving the XYθ table 6 in the Z direction by a movement amount according to the height of the mask detected by the Z sensor 12.

Further, the pattern inspection apparatus 1 includes various circuits connected to a bus 14 as illustrated in FIG. 1. Specifically, the pattern inspection apparatus 1 includes an autoloader control circuit 15, a table control circuit 17, and an autofocus control circuit 18. The pattern inspection apparatus 1 also includes a position detection circuit 22, a decompression circuit 23, a reference circuit 24, and the comparison circuit 25. The pattern inspection apparatus 1 further includes the sensor circuit 19 and the sensor circuit 19 is connected between the photodiode array 8, and the reference circuit 24 and the comparison circuit 25.

The autoloader control circuit 15 controls the autoloader 9 to automatically convey the mask 2 onto the XYθ table 6.

The table control circuit 17 executes control of scanning an inspection region 201 (see FIG. 3) of the mask 2 where defects of the patterns are to be inspected with the light from the light source 3 along stripes 202 that are obtained by virtually dividing the inspection region 201 into a plurality of strip shapes. Specifically, the table control circuit 17 drives and controls the motors 10A to 10C to move the XYθ table 6 so as to scan the inspection region 201 with the light from the light source 3 along the stripes 202.

The autofocus control circuit 18 controls the focusing mechanism 13 according to the height of the mask detected by the Z sensor 12 to automatically focus the light of the light source 3 on the mask.

The sensor circuit 19 takes in the electrical signal obtained by the photoelectric conversion of the photodiode array 8 and performs A/D conversion of the taken electrical signal to generate image data. The sensor circuit 19 outputs the image data to the reference circuit 24 and the comparison circuit 25. The sensor circuit 19 may be, for example, a circuit of a TDI (Time Delay Integration) sensor. With use of the TDI sensor, an image of the patterns can be taken with high accuracy.

The laser-length measurement system 11 detects the movement position of the XYθ table 6 and outputs the detected movement position to the position detection circuit 22. The position detection circuit 22 detects the position of the mask 2 on the XYθ table 6 on the basis of the movement position input from the laser-length measurement system 11. The position detection circuit 22 outputs the detected position of the mask 2 to the comparison circuit 25.

The decompression circuit 23 reads design data stored in a magnetic disk device 31, which will be described later, from the magnetic disk device 31.

The design data is basic data for pattern formation of the mask 2 and is created, for example, by converting CAD (Computer-Aided Design) data indicating the shapes of designed patterns and the like into data of a hierarchical format such as OASIS. The design data includes, for example, layout data indicating placement states of chips that are respectively pattern groups, and chip data indicating a frame and the like that constitute each of the chips. The positions and the like of the chips are defined in the layout data. The design data also includes a chip address unit being the unit dimension of a chip with respect to each of the chips. Furthermore, the design data has a scale ratio for each of the chips. The scale ratio is, for example, a shrink ratio of a chip used when the chip is drawn in a shrunk state on a mask blank in a manufacturing process of the mask 2.

The decompression circuit 23 converts the design data read from the magnetic disk device 31 to, for example, binary or multivalued reference image data that represents the chips with graphics of a unit dimension according to the address unit and the scale ratio. The decompression circuit 23 outputs the converted reference image data to the reference circuit 24.

The reference circuit 24 performs a filter operation using filter coefficients (that is, parameter information) calculated in advance by a control computer 30, which will be described later, to the reference image data input from the decompression circuit 23. A reference image to be used in a defect inspection for the patterns of the mask 2 is generated by performing the filter operation. The filter coefficients are coefficients that can approximate the reference image data to the image data based on the optical image. The filter coefficients have, for example, a value defining a feathering amount or a rounding amount to be applied to the reference image data in the filter operation. The reference circuit 24 outputs the generated reference image to the comparison circuit 25.

The comparison circuit 25 performs a defect inspection for the patterns on the basis of the image data input from the sensor circuit 19 and the reference image input from the reference circuit 24. Specifically, the comparison circuit 25 measures the line width of each position of the patterns of the image data using the position information input from the position detection circuit 22. The comparison circuit 25 compares the line width and the gradation value, that is, the luminance between the patterns of the measured image data and the patterns of the reference image. The comparison circuit 25 then detects, for example, an error between the line widths of the patterns of the image data and the line widths of the patterns of the reference image as a defect of the patterns.

In addition to the configuration described above, the pattern inspection apparatus 1 includes the control computer 30, the magnetic disk device 31, a CRT (Cathode Ray Tube) 32, and a printer 33 as illustrated in FIG. 1. These constituent parts 30 to 33 are all connected to the bus 14.

The control computer 30 executes various kinds of processing related to a defect inspection, such as calculation of the filter coefficients. The method of calculating the filter coefficients is described in detail in the following explanations of a pattern inspection method. The magnetic disk device 31 stores therein the design data. The CRT 32 displays various images related to the defect inspection. The printer 33 prints various kinds of information related to the defect inspection.

(Pattern Inspection Method)

Figure 2:
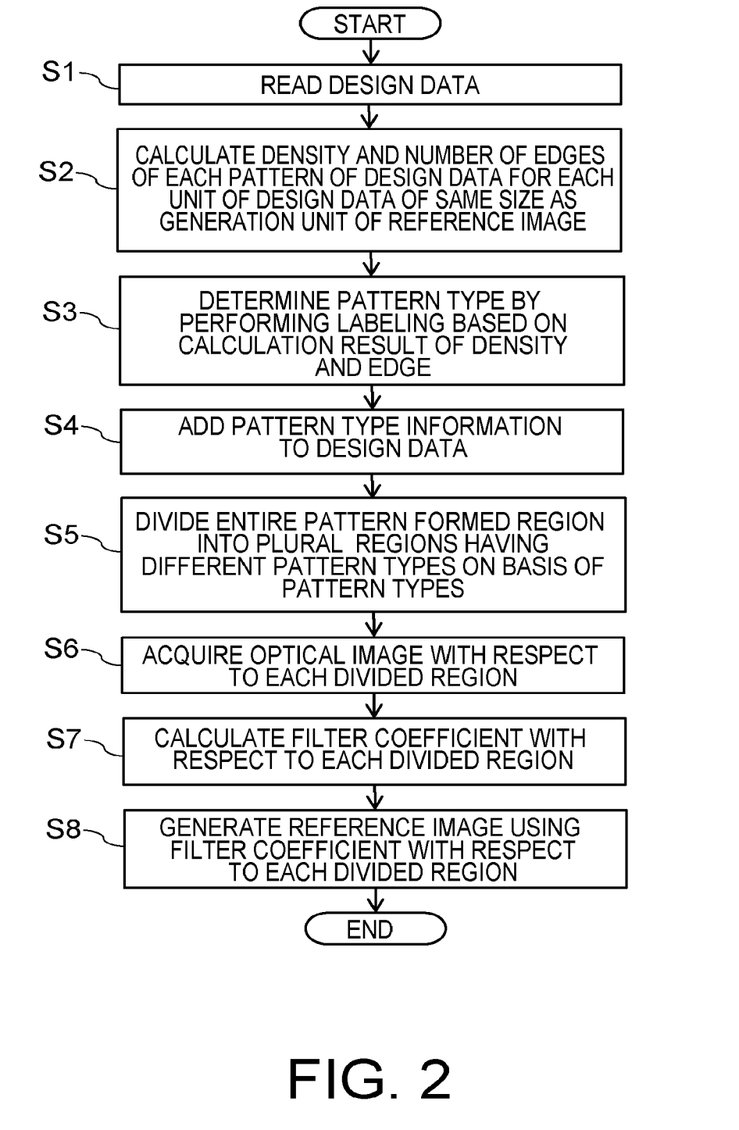
FIG. 2 is a flowchart illustrating the pattern inspection method according to the first embodiment.
Figure 3:
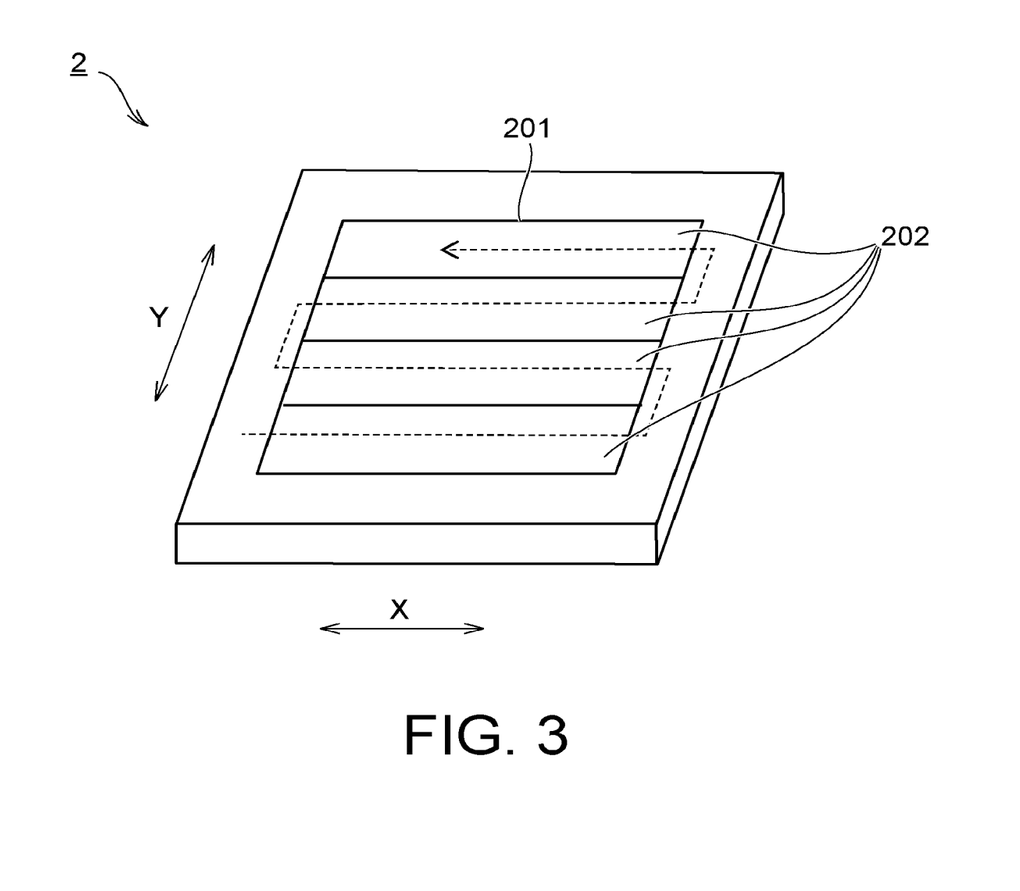
FIG. 3 is a perspective view illustrating the pattern inspection method according to the first embodiment.

A pattern inspection method according to the first embodiment, to which the pattern inspection apparatus 1 illustrated in FIG. 1 is applied, is explained next. FIG. 2 is a flowchart illustrating the pattern inspection method according to the first embodiment. FIG. 2 illustrates processes to generation of a reference image in the pattern inspection method. FIG. 3 is a perspective view illustrating the pattern inspection method according to the first embodiment. In the pattern inspection method, the XYθ table 6 is moved in such a manner that the stripes 202 in the inspection region 201 are continuously scanned in a direction indicated by a dashed arrow in FIG. 3. Defects of the patterns on the stripes 202 are inspected based on the optical image captured by the photodiode array 8 while the XYθ table 6 is moved.

First, the control computer 30 reads the design data from the magnetic disk device 31 before starting an inspection as illustrated in FIG. 2 (Step S1).

After reading the design data, the control computer 30 calculates the densities and the numbers of edges of the patterns of the design data with respect to each unit of the design data having the same image size as a generation unit of a reference image (Step S2). The density of a pattern is the ratio (%) of the area of the pattern with respect to the area of the entire pattern formed region of the mask on which the patterns are formed, that is, the white/black ratio. The number of edges of a pattern is the number of ends of the pattern. There are two kinds of the number of edges, that is, the number of edges in the X direction in a case of counting ends of a pattern along the X direction and the number of edges in the Y direction in a case of counting ends of the pattern in the Y direction.

After calculating the densities and the numbers of edges of the patterns of the design data, the control computer 30 determines types of the patterns by performing labeling to classify a plurality of patterns having densities and numbers of edges that are close to each other into a same group on the basis of the calculated densities and numbers of edges of the patterns (Step S3). The control computer 30 generates pattern type information indicating the types of the patterns as characteristic information that indicate characteristics of the patterns by determining the types of the patterns.

Figure 4:
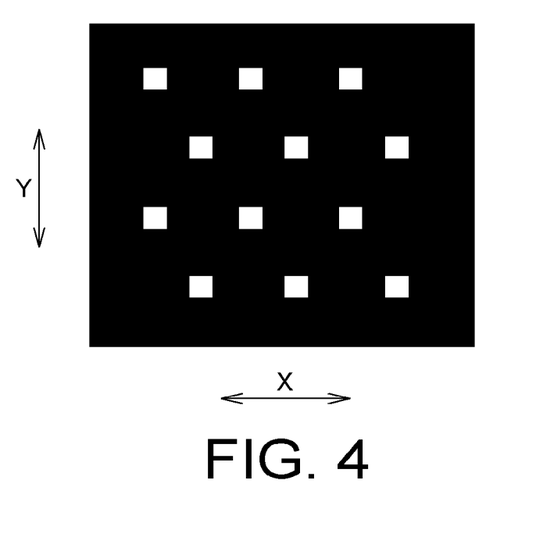
FIG. 4 is a plan view illustrating a pattern of a first pattern type in the pattern inspection method according to the first embodiment.
Figure 5:
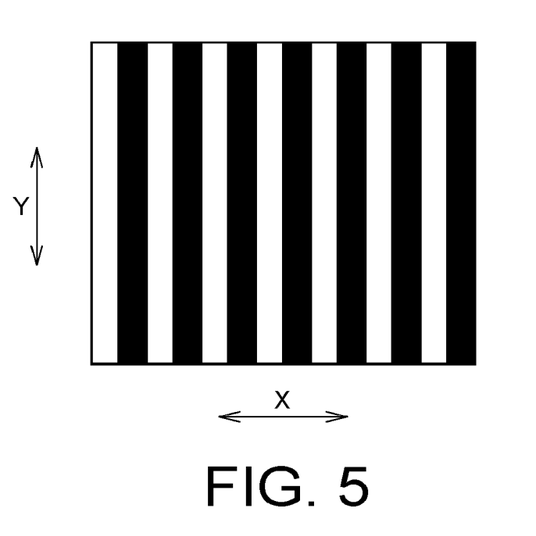
FIG. 5 is a plan view illustrating a pattern of a second pattern type in the pattern inspection method according to the first embodiment.
Figure 6:
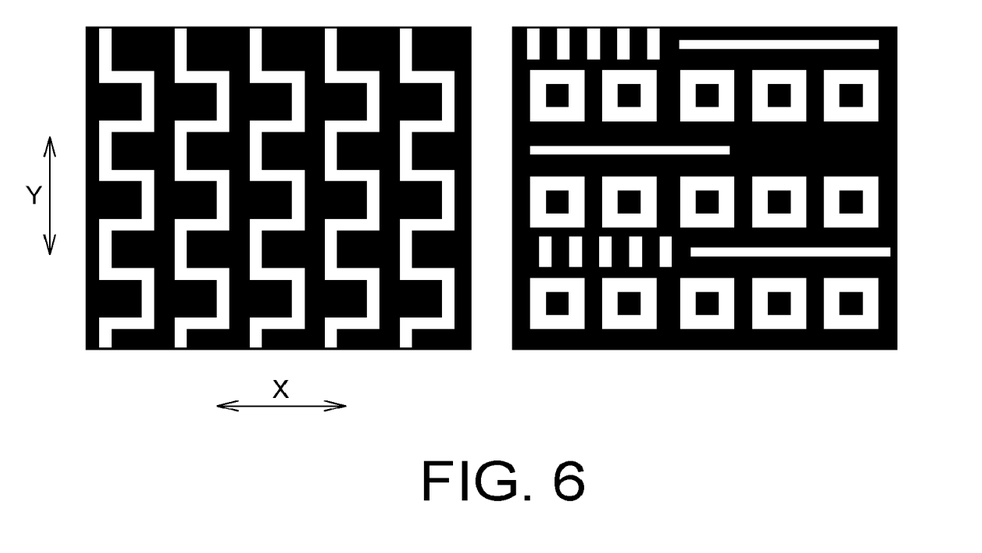
FIG. 6 is a plan view illustrating patterns of a third pattern type in the pattern inspection method according to the first embodiment.

FIG. 4 is a plan view illustrating a pattern of a first pattern type in the pattern inspection method according to the first embodiment. FIG. 5 is a plan view illustrating a pattern of a second pattern type in the pattern inspection method according to the first embodiment. FIG. 6 is a plan view illustrating patterns of a third pattern type in the pattern inspection method according to the first embodiment.

FIGS. 4 to 6 illustrate patterns of design data of the same image size as the generation unit of a reference image. In FIGS. 4 to 6, a black region indicates a formation region of a pattern and a white region indicates a region where no pattern is formed. In the pattern illustrated in FIG. 4, the density of the region where no pattern is formed is 10%, the number of edges in the X direction is Nx1, and the number of edges in the Y direction is Ny1. In the pattern illustrated in FIG. 5, the density is 50%, the number of edges in the X direction is Nx2, and the number of edges in the Y direction is 0 (zero). In the two patterns illustrated in FIG. 6, the density is 40%, the number of edges in the X direction is Nx3, and the number of edges in the Y direction is Ny3. The control computer 30 classifies these patterns illustrated in FIGS. 4 to 6 into different types.

After generating the pattern type information, the control computer 30 adds (that is, additionally writes) the generated pattern type information to the design data as illustrated in FIG. 2 (Step S4). Specifically, the control computer 30 stores the generated pattern type information in the magnetic disk device 31 in a state added to the design data (that is, a state connected to the pattern of the corresponding type). After adding the pattern type information to the design data, the control computer 30 reads the design data of a plurality of patterns formed on the mask 2 and the pattern type information of each pattern added to the design data from the magnetic disk device 31 in an inspection setup. The control computer 30 virtually divides the entire pattern formed region on the design data into a plurality of regions having different pattern types on the basis of the types of the patterns indicated by the pattern type information (Step S5). In the inspection setup, loading of the mask 2 by the autoloader 9, alignment of the mask 2 by the XYθ table 6, calibration of imaging conditions (for example, the amount of light) according to the mask 2 by a calibration circuit (not illustrated), setting of the inspection region 201 by the control computer 30, and a learning process of modifying the reference image using a typical optical image are performed. In the learning process, Step S5 and following Steps S6 and S7 are performed.

Figure 7:
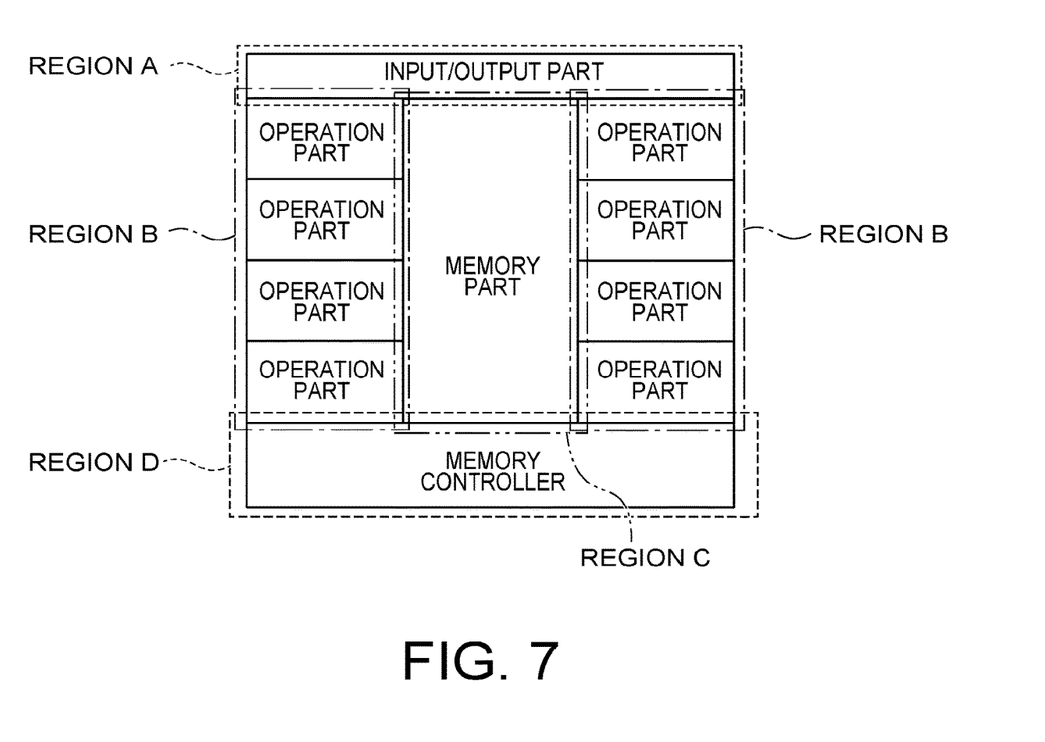
FIG. 7 is an explanatory diagram for explaining a process of dividing a pattern formed region into a plurality of regions in the pattern inspection method according to the first embodiment.

After dividing the entire pattern formed region into the regions, the control computer 30 acquires an optical image of the mask 2 with respect to each of the divided regions (Step S6). FIG. 7 is an explanatory diagram for explaining a process of dividing the pattern formed region into the regions in the pattern inspection method according to the first embodiment. FIG. 7 illustrates an example in which the pattern formed region is divided into regions respectively corresponding to a plurality of functional blocks of a semiconductor chip that is manufactured using the mask 2. In the example illustrated in FIG. 7, the pattern formed region is divided into regions A to D corresponding to an input/output part, an operation part, a memory part, and a memory controller, respectively. The positional relation of the regions A to D on the mask does not necessarily match the positional relation of the regions A to D on the semiconductor chip.

After acquiring the optical image, the control computer 30 calculates filter coefficients according to the types of the patterns to generate a reference image to be used in the inspection of the patterns from the design data on the basis of the optical image with respect to each of the divided regions as illustrated in FIG. 2 (Step S7). In calculating the filter coefficients, image data based on the optical image and reference image data based on the design data are compared with each other for each of the divided regions to calculate a filter coefficient that can approximate the reference image data to the image data based on the optical image. By calculation of the filter coefficient for each of the regions, different filter coefficients can be calculated to the pattern types, respectively. For example, a filter coefficient that increases the rounding amount can be calculated for a complicated pattern where the density is high and the number of edges is large and a filter coefficient that decreases the rounding amount can be calculated for a simple pattern where the density is low and the number of edges is small.

After the filter coefficients are calculated, the reference circuit 24 acquires the calculated filter coefficients from the control computer 30. At the time of a pattern inspection, the reference circuit 24 generates a reference image from the design data with respect to each of the divided regions using the calculated filter coefficients (Step S8).

There are dense patterns and sparse patterns on the pattern formed region and patterns having different shapes are laid out thereon. Therefore, the patterns are not uniform. If a reference image is generated using one set of filter coefficients common to the entire pattern formed region where the patterns are not uniform, it is sometimes difficult to generate a high-accuracy reference image. For example, if the filter operation is performed to both design data of a dense pattern and design data of a sparse pattern using a common filter coefficient, a reference image having a greatly different shape from the optical image is generated from the design data of one of the patterns in some cases.

In contrast thereto, according to the first embodiment, a filter coefficient according to a pattern type is calculated for each of regions divided on the basis of the pattern type information, where the pattern types are different from each other. By generating a reference image using a filter coefficient according to the pattern type in this manner, a high-accuracy reference image according to the pattern type can be generated. As a result, detection of a false defect can be suppressed. Furthermore, because the pattern types can be automatically determined according to the first embodiment, labor of the defect inspection can be lessened. The control computer 30 may determine the pattern types also on the basis of a pattern size in addition to the pattern density and the number of edges. In this case, filter coefficients according to pattern types more finely divided can be calculated and therefore a higher-accuracy reference image can be generated.

Second Embodiment

Figure 8:
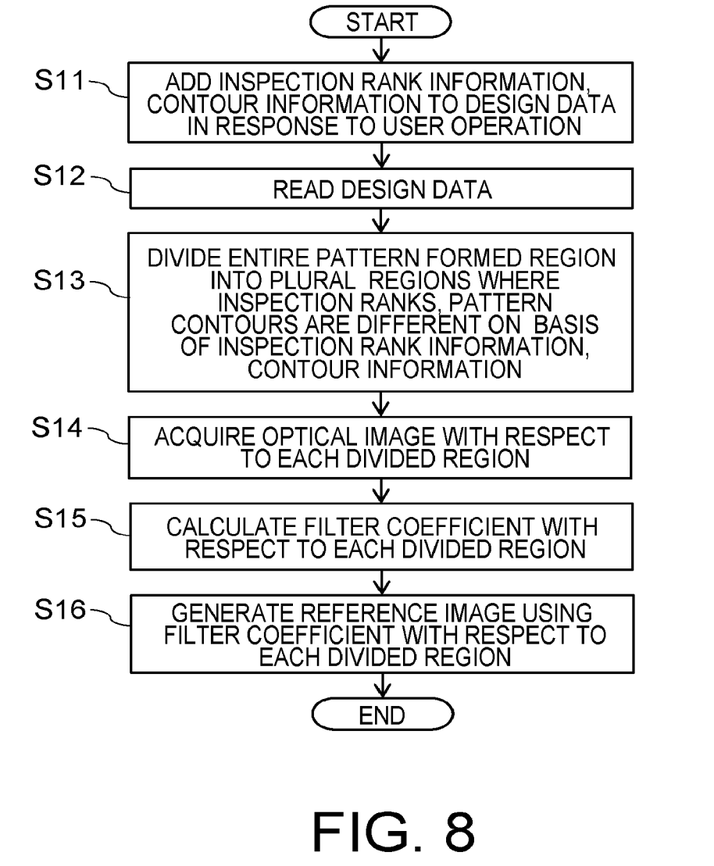
FIG. 8 is a flowchart illustrating a pattern inspection method according to a second embodiment.

A pattern inspection method according to a second embodiment is explained next with reference to FIG. 8. FIG. 8 is a flowchart illustrating the pattern inspection method according to the second embodiment. The pattern inspection method according to the second embodiment can be carried out by using the pattern inspection apparatus 1 described with reference to FIG. 1.

First, as illustrated in FIG. 8, the control computer 30 adds inspection rank information and contour information as characteristic information to the design data stored in the magnetic disk device 31 in response to a user operation (Step S11). The inspection rank information is information indicating the sensitivity of a pattern inspection, that is, the inspection rank that is the size of defects to be detected. For example, the inspection rank information is rank information associated with a technology node that is determined from a layer or a pattern shape. The contour information is information indicating the contour, that is, the shape of a pattern.

After the inspection rank information and the contour information is added to the design data, the control computer 30 reads the design data to which the inspection rank information and the contour information has been added from the magnetic disk device 31 (Step S12).

After reading the design data, the control computer 30 virtually divides the entire pattern formed region on the design data into a plurality of regions where the inspection ranks and the pattern contours are different from each other on the basis of the inspection rank information and the contour information added to the design data (Step S13).

After dividing the pattern formed region into the regions, the control computer 30 acquires an optical image of the mask 2 with respect to each of the divided regions (Step S14).

After acquiring the optical image, the control computer 30 calculates filter coefficients according to the inspection ranks and the pattern contours to generate a reference image to be used in a pattern inspection from the design data on the basis of the optical image with respect to each of the divided regions (Step S15).

After the filter coefficients are calculated, the reference circuit 24 generates a reference image from the design data on the basis of the calculated filter coefficients at the time of an inspection (Step S16).

According to the second embodiment, a filter coefficient according to an inspection rank and a pattern contour is calculated for each of regions divided on the basis of the inspection rank information and the contour information. By generating a reference image using a filter coefficient according to an inspection rank and a pattern contour in this manner, a high-accuracy reference image according to the inspection rank and the contour of the pattern can be generated. As a result, detection of a false defect can be suppressed.

At least a part of the pattern inspection apparatus 1 can be constituted by hardware or by software. When it is constituted by software, the pattern inspection apparatus 1 can be configured such that a program for realizing at least a part of the functions of the pattern inspection apparatus 1 is stored in a recording medium such as a flexible disk or a CD-ROM, and the program is read and executed by a computer. The recording medium is not limited to a detachable device such as a magnetic disk or an optical disk, and may be a fixed recording medium such as a hard disk device or a memory.

The embodiments described above have been presented by way of example only and are not intended to limit the scope of the invention. The embodiments can be implemented in a variety of other forms, and various omissions, substitutions and changes can be made without departing from the spirit of the invention. The embodiments and modifications thereof are included in the scope of invention described in the claims and their equivalents as well as the scope and the spirit of the invention.

The invention claimed is:

1. A reference image generation method comprising:
reading design data of a plurality of patterns formed on a sample and characteristic information indicating characteristics of each of the patterns from a storage device, the characteristic information being additionally written in the design data;
dividing a pattern formed region of the sample on which the patterns are formed, into a plurality of regions where the characteristics within each region are of a similar pattern type and characteristics of different of the plurality of regions are different from each other, on a basis of the characteristic information and pattern type;
calculating parameter information according to the characteristics with respect to each of the regions, where the parameter information is filter coefficients, so that each of the plurality of regions has a respective filter characteristic, for generating a reference image by calculating with the design data to be used in an inspection of the patterns; and
generating the reference image from the design data on a basis of the calculated parameter information.

2. The method of claim 1, wherein the characteristic information is pattern type information indicating types of the patterns.

3. The method of claim 2, further comprising:
before the dividing of the pattern formed region into the regions,
calculating a density and number of edges of each of the patterns of the design data with respect to each unit of the design data having a same image size as a generation unit of the reference image;
generating the pattern type information by determining a type of each of the patterns with respect to each unit of the design data on a basis of the calculated density and the calculated number of edges; and
adding the pattern type information to the design data with respect to each unit of the design data.

4. The method of claim 3, wherein the generating of the pattern type information comprises determining a type of each of the patterns by performing labeling to classify a plurality of patterns where densities and numbers of edges are close to each other into a same group on a basis of the calculated density and the calculated number of edges.

5. The method of claim 1, wherein the characteristic information is at least either inspection rank information indicating inspection ranks of the patterns or contour information indicating contours of the patterns.

6. The method of claim 5, comprising
before the dividing of the pattern formed region into the regions,
adding at least either the inspection rank information or the contour information to the design data in response to a user operation.

7. A pattern inspection method comprising:
reading design data of a plurality of patterns formed on a sample and characteristic information indicating characteristics of each of the patterns from a storage device, the characteristic information being additionally written in the design data;
dividing a pattern formed region of the sample on which the patterns are formed, into a plurality of regions where the characteristics within each region are of a similar pattern type and characteristics of different of the plurality of regions are different from each other, on a basis of the characteristic information;
calculating parameter information according to the characteristics with respect to each of the regions, where the parameter information is filter coefficients, so that each of the plurality of regions has a respective filter characteristic, for generating a reference image by calculating with the design data to be used in an inspection of the patterns;
generating the reference image from the design data on a basis of the calculated parameter information; and
inspecting a defect of the patterns on a basis of the reference image and an optical image obtained by imaging the sample.

* * * * *